UNITED STATES PATENT OFFICE.

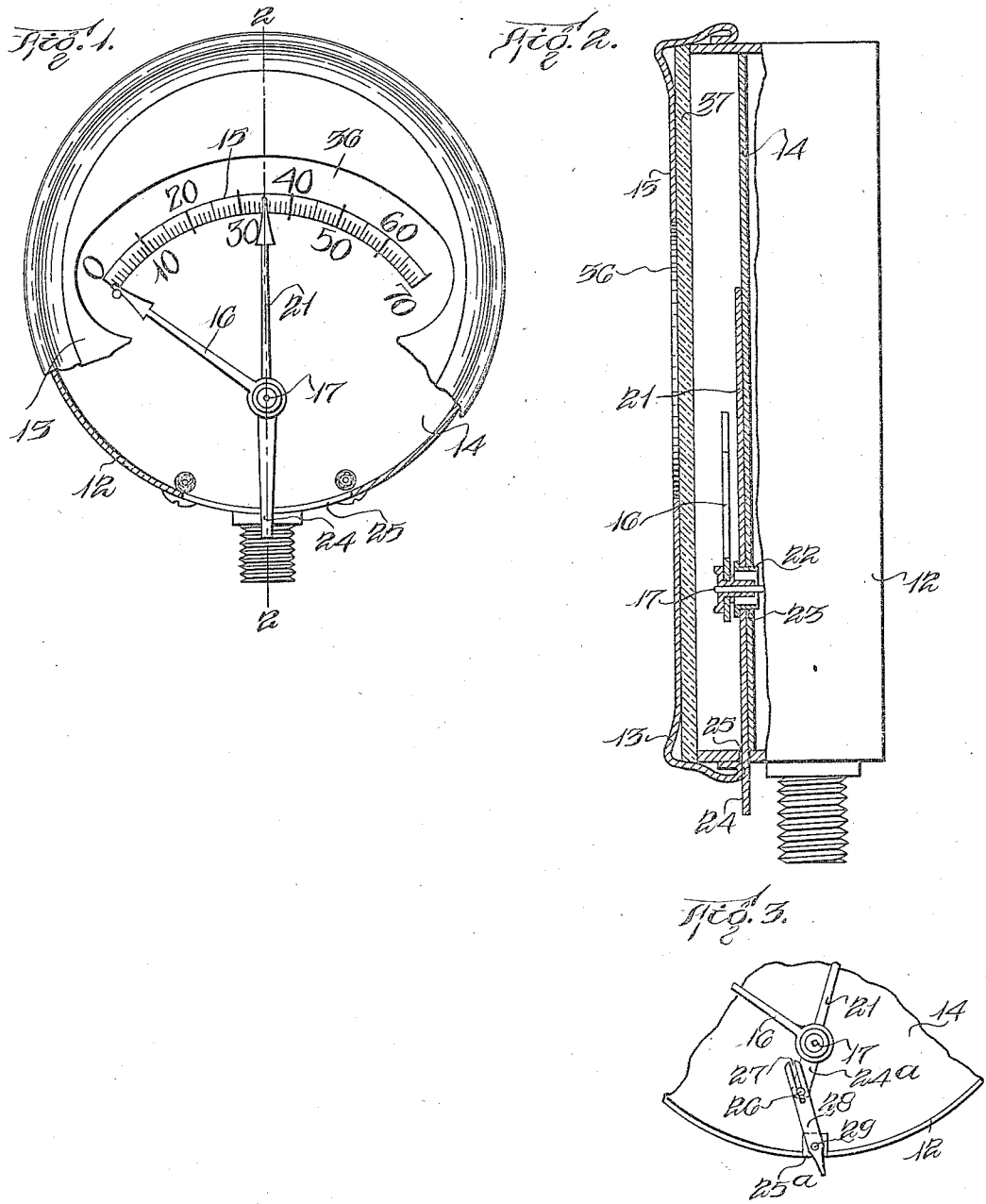

COLEMAN J. MANNING, OF MEDFORD, MASSACHUSETTS, ASSIGNOR TO AMERICAN STEAM GAUGE & VALVE MANUFACTURING COMPANY, OF BOSTON, MASSACHUSETTS, A CORPORATION OF MASSACHUSETTS.

ALTITUDE-GAGE.

1,160,426.            Specification of Letters Patent.         Patented Nov. 16, 1915.

Application filed September 21, 1914. Serial No. 862,647.

*To all whom it may concern:*

Be it known that I, COLEMAN J. MANNING, a citizen of the United States, and resident of Medford, in the county of Middlesex and State of Massachusetts, have invented certain new and useful Improvements in Altitude-Gages, of which the following is a specification.

This invention relates to a gage for indicating the height of a column of water in a heating system or elsewhere. A gage of this character is provided with a pressure-controlled pointer movable over a dial attached to the gage casing and operated by variations of pressure acting on a Bourdon tube or spring which is connected by suitable mechanism with the arbor on which the pointer is mounted, the arrangement being such that variations in the altitude of a column of water will cause corresponding variations of position of the pointer.

The invention has for its object to provide improved means for supporting and adjusting an independent pointer adapted to coöperate with the dial in indicating the maximum altitude to be registered by the usual mechanism of the gage.

The invention consists in the improvements which I will now proceed to describe and claim.

Of the accompanying drawings forming a part of this specification, Figure 1 represents a front view of an altitude gage embodying my invention, a part of the casing front or cover being broken away and a part of the casing shown in section; Fig. 2 is an enlarged section on line 2—2 of Fig. 1; Fig. 3 is a view similar to a portion of Fig. 1, showing another embodiment of the invention.

The same reference characters indicate the same or similar parts in all the views.

In the drawings, 12 represents the body and 13 the front or cover of the casing of an altitude gage, the dial 14 of which is secured to the body of the casing at a suitable distance behind the front or cover 13, and is provided with the usual graduated scale 15.

16 represents the usual pressure-actuated pointer, the hub of which is suitably secured to the arbor 17 forming a part of the usual gage mechanism, said arbor being rocked or oscillated in its bearings by variations of pressure acting on a Bourdon spring or tube, and suitable gearing connecting said spring with the arbor, the said tube and the gearing being inclosed in the casing between the dial 14 and the back of the casing. I have not shown the Bourdon spring and gearing in the drawings, these constituting a mechanism which is common and well known.

21 represents an independent pointer which is movable manually over the dial and is adapted to coöperate therewith in indicating the maximum altitude of the liquid in the system with which the gage is connected, the pointer 21 being movable in the same arc as the pointer 16 and retained by friction at any position to which it may be moved. The independent pointer 21 is attached to a hub 22, which has a close frictional fit in an orifice 23 formed in the dial 14, the wall of said orifice surrounding the arbor 17 and being of relatively large diameter so that it is separated from the arbor by an annular space which receives the hub 22, said hub being concentric with said arbor and free from contact therewith.

24 represents an arm or lever formed integral with the pointer 21 and projecting from the hub thereof through a slot 25 in the body portion of the casing and in front of the plane of the dial, the said lever projecting outwardly from the exterior of the casing far enough to be conveniently grasped and moved to adjust the pointer 21.

Fig. 3 shows the pointer 21 provided with a shorter integral arm 24ª having a pin 26 projecting into a slot 27 in one arm of a lever 28 which is pivoted at 29 to the casing, its other arm projecting through a short slot 25ª in the casing body.

The independent pointer 21 being adjusted or set to register the height at which a column of liquid should be maintained, the relative positions of the pointers 21 and 16 will indicate whether the column is actually at the predetermined height or not.

The independent pointer 21 engaged with an orifice in the dial is supported entirely by the dial, no independent supporting means being required, and no change or modification of the dial being required other than a suitable enlargement of the usual orifice 23 through which the pressure-controlled arbor 17 extends. The direct engagement of the independent pointer with the dial locates said pointer between the pressure-indicating pointer and the dial so that said independent pointer does not require to be made longer than the pointer 16 in order that its outer end may be in close proximity to the dial.

Having described my invention, I claim:

1. An altitude gage comprising a casing, a dial therein, a pressure-controlled arbor extending through the dial, a pressure-indicating pointer carried by said arbor, an independent pointer adapted to be manually set to indicate a given altitude, said independent pointer being located between the pressure-indicating pointer and the dial and free from engagement with the pressure-indicating pointer, said independent pointer and dial being provided with complemental parts constituting a frictional pivotal connection between the pointer and the dial, whereby the pointer is adjustably supported and caused to stand at any position to which it may be adjusted, and a manually movable setting lever connected with said independent pointer and extending through a slot in the casing.

2. An altitude gage comprising a casing, a dial therein having a circular orifice, a pressure-controlled arbor extending through and adapted to turn in said orifice, a pressure-indicating pointer carried by said arbor, the said orifice being relatively large and separated from the arbor by an annular space, and the lower portion of the casing being provided with a slot located outside the plane of the dial, an independent frictionally maintained pointer having an annular hub surrounding the arbor and frictionally engaged with the wall of said orifice, said independent pointer being adapted to be manually set to indicate a given altitude, and free from engagement with the pressure-indicating pointer, and a manually movable setting lever connected with said independent pointer and extending through said slot, the independent pointer being located between the pressure-indicating pointer and the dial.

In testimony whereof I have affixed my signature, in presence of two witnesses.

COLEMAN J. MANNING.

Witnesses:
F. R. ROULSTONE,
P. W. PEZZETTI.